US009054869B2

(12) United States Patent
Pirskanen et al.

(10) Patent No.: US 9,054,869 B2
(45) Date of Patent: Jun. 9, 2015

(54) SYSTEM AND METHOD FOR IMPROVING REORDERING FUNCTIONALITY IN RADIO COMMUNICATIONS

(75) Inventors: Juho Pirskanen, Tampere (FI); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 860 days.

(21) Appl. No.: 12/113,885

(22) Filed: May 1, 2008

(65) Prior Publication Data

US 2009/0092077 A1    Apr. 9, 2009

Related U.S. Application Data

(60) Provisional application No. 60/915,643, filed on May 2, 2007.

(51) Int. Cl.
    H04L 12/953    (2013.01)
    H04L 1/18      (2006.01)

(52) U.S. Cl.
    CPC .................................. *H04L 1/1841* (2013.01)

(58) Field of Classification Search
    USPC ............................................ 370/328; 714/55
    See application file for complete search history.

(56) References Cited

U.S. PATENT DOCUMENTS

| 4,630,262    | A  | * | 12/1986 | Callens et al. ................ 370/435 |
| 6,738,379    | B1 | * | 5/2004  | Balazinski et al. ........... 370/394 |
| 2003/0128705 | A1 | * | 7/2003  | Yi et al. ........................ 370/394 |
| 2003/0206559 | A1 | * | 11/2003 | Trachewsky et al. ......... 370/509 |
| 2003/0210669 | A1 |   | 11/2003 | Vayanos et al. |
| 2004/0253955 | A1 | * | 12/2004 | Love et al. .................... 455/442 |
| 2006/0111110 | A1 | * | 5/2006  | Schwarz et al. .............. 455/439 |
| 2006/0146858 | A1 | * | 7/2006  | Kim .............................. 370/432 |
| 2006/0223551 | A1 | * | 10/2006 | Hergenhan et al. .......... 455/458 |
| 2007/0042782 | A1 | * | 2/2007  | Lee et al. ...................... 455/450 |
| 2007/0259673 | A1 | * | 11/2007 | Willars et al. ................. 455/453 |
| 2007/0291788 | A1 | * | 12/2007 | Sammour et al. ............. 370/466 |
| 2008/0008152 | A1 | * | 1/2008  | Lohr et al. .................... 370/342 |
| 2008/0137564 | A1 | * | 6/2008  | Herrmann ..................... 370/310 |
| 2008/0209297 | A1 | * | 8/2008  | Chandra et al. ............... 714/748 |
| 2008/0225765 | A1 | * | 9/2008  | Marinier et al. .............. 370/310 |
| 2008/0259832 | A1 | * | 10/2008 | Tseng ........................... 370/310 |
| 2008/0267148 | A1 | * | 10/2008 | Speight ......................... 370/338 |
| 2009/0034466 | A1 | * | 2/2009  | Lindskog et al. ............. 370/329 |

(Continued)

FOREIGN PATENT DOCUMENTS

WO    WO-01/20874 A1    3/2001

OTHER PUBLICATIONS

"Reordering for common H-RNTI", 3GPP TSG-RAN WG2#58bis, Orlando, Florida, Jun. 25-29, 2007.*

(Continued)

*Primary Examiner* — Brandon Renner
*Assistant Examiner* — Scott M Sciacca
(74) *Attorney, Agent, or Firm* — Harrington & Smith

(57) ABSTRACT

The definition and use of an additional timer for the MAC-hs reordering function in a user equipment. The timer counts transmission time intervals and is reset each time that the user equipment receives a data packet. If the timer reaches a set value, indicating a sufficiently long period of inactivity, then the transmission sequence number is reset to zero or another predefined value. A base station can run a similar timer and, after the timer reaches a set value, can consider the user equipment as no longer being active.

25 Claims, 5 Drawing Sheets

(56) References Cited

U.S. PATENT DOCUMENTS

2009/0310534 A1* 12/2009 Lindskog et al. ............ 370/328
2010/0027565 A1* 2/2010 Gupta et al. ................. 370/475

OTHER PUBLICATIONS

"Reordering in Enhanced Cell_Fach", 3GPP TSG-RAN WG2#57bis, Malta, Mar. 26-30, 2007.*

"Universal Mobile Telecommunications System (UMTS); Medium Access Control (MAC) protocol Specification (3GPP TS 25.321 version 7.4.0 release 7); ETSI TS 123 321" ETSI Standards, vol. 3-R2, No. V7.4.0. Mar. 1, 2007.

International Search Report for PCT Application No. PCT/IB2008/051699, Oct. 6, 2008.

* cited by examiner

SYSTEM AND METHOD FOR IMPROVING REORDERING FUNCTIONALITY IN RADIO COMMUNICATIONS

CROSS-REFERENCE TO RELATED APPLICATIONS

The present application claims priority to U.S. Provisional Patent Application No. 60/915,643, filed May 2, 2007.

FIELD OF THE INVENTION

The present invention relates generally to radio communications. More particularly, the present invention relates to the data reception in radio communications when the connection state of a user equipment item and the network is not a dedicated channel connection state.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Third Generation Partnership Project (3GPP) is a collaboration of several independent standardization organizations that is focused on the development of globally applicable third generation mobile phone system specifications. The Technical Specification Group Radio Access Network (TSG RAN) is responsible for the definition of the functions, requirements and interfaces of the universal terrestrial radio access (UTRA) network in its two modes, frequency division duplex (FDD) and time division duplex (TDD).

3GPP Release 5 (Rel5) introduced a new high speed downlink shared channel (HS-DSCH). In HS-DSCH transmission utilizing a hybrid automatic-repeat-request (HARQ) system (a N-process stop-and-wait system), and due to fact that different HARQ processes may require a different number of retransmissions, the medium access layer (MAC-hs) packet data units (PDUs) are not necessarily received in order by a desiring MAC-hs receiver. For example, two packets, packet 1 and packet 2, can be sent in consecutive transmission time intervals (TTIs). In this situation, it is possible that when packet 2 is received correctly by layer 1, the packet 1 may need further transmissions before it is correctly received and delivered to the MAC-hs layer of a user equipment (UE) receiver, thus leading to packet 2 getting to the MAC-hs before packet 1 during in-sequence delivery.

In order to provide MAC-hs or MAC-ehs service data units (SDUs) in the correct order for higher layers after HARQ transmission, MAC-hs PDU reordering is performed by the receiver in the MAC-hs. This reordering is performed by using the transmission sequence number (TSN) set by the transmitter in MAC-hs. The TSN effectively provides a running sequence number for each packet so that, even though the packets are received out of order due to HARQ retransmissions, the MAC layer can easily reorder them for in-sequence delivery to the higher protocol layer.

In 3GPP Rel5, when high speed downlink packet access (HSDPA) operation was first introduced, the HSDPA was only used in a dedicated channel (CELL_DCH) state where a UE dedicated radio link and a UE dedicated resources are reserved in a base transceiver station, referred to conventionally and herein as Node B. Therefore, it was required that the transmitter set the TSN in an increasing order, starting from zero, when transmitting the MAC-hs PDUs to UE. In this situation, the receiver would always receive every consecutive TSN (0, 1, 2, 3, 4, 5, . . . ) even though the UE would not be continuously transmitted with new data in each consecutive TTI, i.e., every packet that was transmitted receives the TSN value $TSN_{previous\_packet}+1$, and a missing TSN value (e.g. receive 0, 1, 2, 3, 5, 6, 7, where 4 is missing) would indicate a packet lost by L1.

In the CELL_FACH state or when HS-DSCH reception is also configured in CELL/UTRAN Registration Area Paging Channel (CELL_PCH/URA_PCH) states, however, there is no UE-specific context in Node B established by radio link (RL) setup procedure. The Node B just receives the HS-DSCH radio network identifier (H-RNTI) to be used for the transmission and the data to be transmitted from the Iub Frame Protocol connection from the RNC to the Node B, which is shared between different users. Therefore, if the conventional TSN increment method were used, then the Node B would start the TSN from zero for specific H-RNTIs (for a specific user) and increase the TSN when transmitting the next MAC-hs PDUs. However, as the UE expects the increased TSN number, the Node B would need to know the TSN that was used when the previous transmission to that particular UE took place, even if data was last transmitted to that UE quite a long time earlier.

An example of the above issue is as follows. In this example, it is helpful to consider a situation where Node B sends 1200 bits to the UE in a 4 HARQ processes (e.g., in TTIs that may be consecutive, or there may be some TTIs in which no data is sent between data-containing TTIs) with 300 bits in each TTI and with TSN values of 0, 1, 2, and 3. The UE correctly receives the PDUs and increases the next expected TSN value to 4. After the next TSN value is raised, there is a 10 second period of inactivity when Node B does not receive any data from the network that is to be delivered to the specific H-RNTI identifying this user. After this period of inactivity, another 1200 bits are then received. If Node B is able to "remember" the previous TSN setting for this particular UE, it would set the TSN to 4 for the first PDU of the 4 PDUs to be transmitted, and reordering would work as in current specification. However, if Node B cannot remember the previous TSN setting (i.e., such memory is not maintained in Node B), then Node B would need to start the TSN from zero again, essentially operating as if the next transmission is the first transmission for this UE. In this case, the UE would receive TSN 0, even though it is expecting to receive TSN 5. As a result, the UE would consider packets 4-63 to be missing (TSN is a 6-bit counter that wraps to 0 after 63), and the reordering function would buffer the freshly received packet and wait for packets 4-63 so that the data can be delivered in sequence. The UE would therefore not pass the correctly received PDUs to higher layers until the T1 timer is expired (the T1 timer defines the time that the reordering function waits for missing packets from the sequence before declaring them lost). In light of the above, if the TSN is not correctly set, the MAC-hs reordering function in the UE will consider a TSN to be received out of order and wait until a predefined time (T1), thereby introducing an unnecessary delay for transmission of the first packets received after a period of inactivity.

In an alternative to the above, it is also possible for Node B to keep record of transmissions and use TSN numbers for specific H-RNTI instances. However, there is currently no system for Node B to determine how long such records should be kept, as the Node B would, for example, know if the UE identified by a specific H-RNTI moved to a cell controlled by some other Node B and that H-RNTI was to be allocated to some other UE by the RNC. For example, an H-RNTI instance can be allocated to another UE during the time frame at issue, and then the TSN would once again be incorrectly set.

In accordance with the above, the above issue has been conventionally addressed by either resetting the MAC-hs, and thus resetting the TSN signaling to zero via dedicated RRC signaling, or always delaying the delivery of packets from the reordering function to the higher protocol layer by the length of the T1 timer.

SUMMARY OF THE INVENTION

Various embodiments of the present invention provide for the definition and use of an additional timer for the MAC-hs reordering function in a UE. This new timer counts reception time intervals and is reset each time that the UE receives a data packet. If the timer reaches a set value (i.e., is reset), indicating a sufficiently long period of inactivity, then the TSN is reset to zero or another predefined value. Node B can run a similar timer and, after the timer reaches a set value (i.e., expires), Node B can consider this particular UE as no longer being active. The Node B then no longer has to retain the TSN setting for this particular UE (or, more specifically, for this particular H-RNTI). If new data to this UE is received from the network, Node B can consider this particular UE (for this particular H-RNTI) as a new UE that had not been previously active.

In various embodiments of the present invention, unnecessary reordering delays can be avoided, as the TSN is restarted to a known value. Additionally, with these embodiments, Node B does not need to have an extended history of TSN settings for H-RNTIs. Still further, the problem of reallocating the H-RNTI, when Node B is still having the history recorded, is avoided, as Node B cannot know when a UE has moved to another cell or has ended the data session, and the H-RNTI would be free to be allocated to a new user, thereby becoming active. Also, only simple rules are needed in the MAC-hs specifications to reset the TSN, and the issue of TSN settings in a mobility situation is resolved.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide for the definition and use of an additional timer for the MAC-hs reordering function in a UE. This new timer counts TTIs and is reset each time that the UE receives a data packet. If the timer reaches a set value (i.e., is reset), indicating a sufficiently long period of inactivity, then the TSN is reset to zero or another predefined value. Node B can run a similar timer and, after the timer reaches a set value (i.e., expires), Node B can consider this particular UE as no longer being active. The UE then no longer has to retain the TSN setting for this particular UE. If new data to this UE is received from the network, Node B considers this particular UE as a new UE that had not been previously active. Additionally, in various embodiments the TSN is reset to zero whenever the UE changes its cell and is not in a CELL_DCH state, i.e., performs a cell reselection.

Various embodiments of the present invention relate to 3GPP TSG-RAN Enhanced CELL_FACH State Work Item for Wireless Code Division Multiple Access (WCDMA) Release 7 (Rel7), where the utilization of HSDPA (high speed shared control channel (HS-SCCH) and HS-DSCH) is introduced in CELL_FACH and in CELL/URA_PCH states (where there is no need to reserve dedicated resources for each user in the Node B), in addition to the CELL_DCH state (where dedicated resources are reserved for each user in Node B). More specifically the various embodiments improve the reordering functionality in a UEs MAC-hs protocol in the CELL_FACH state.

Figure 1:
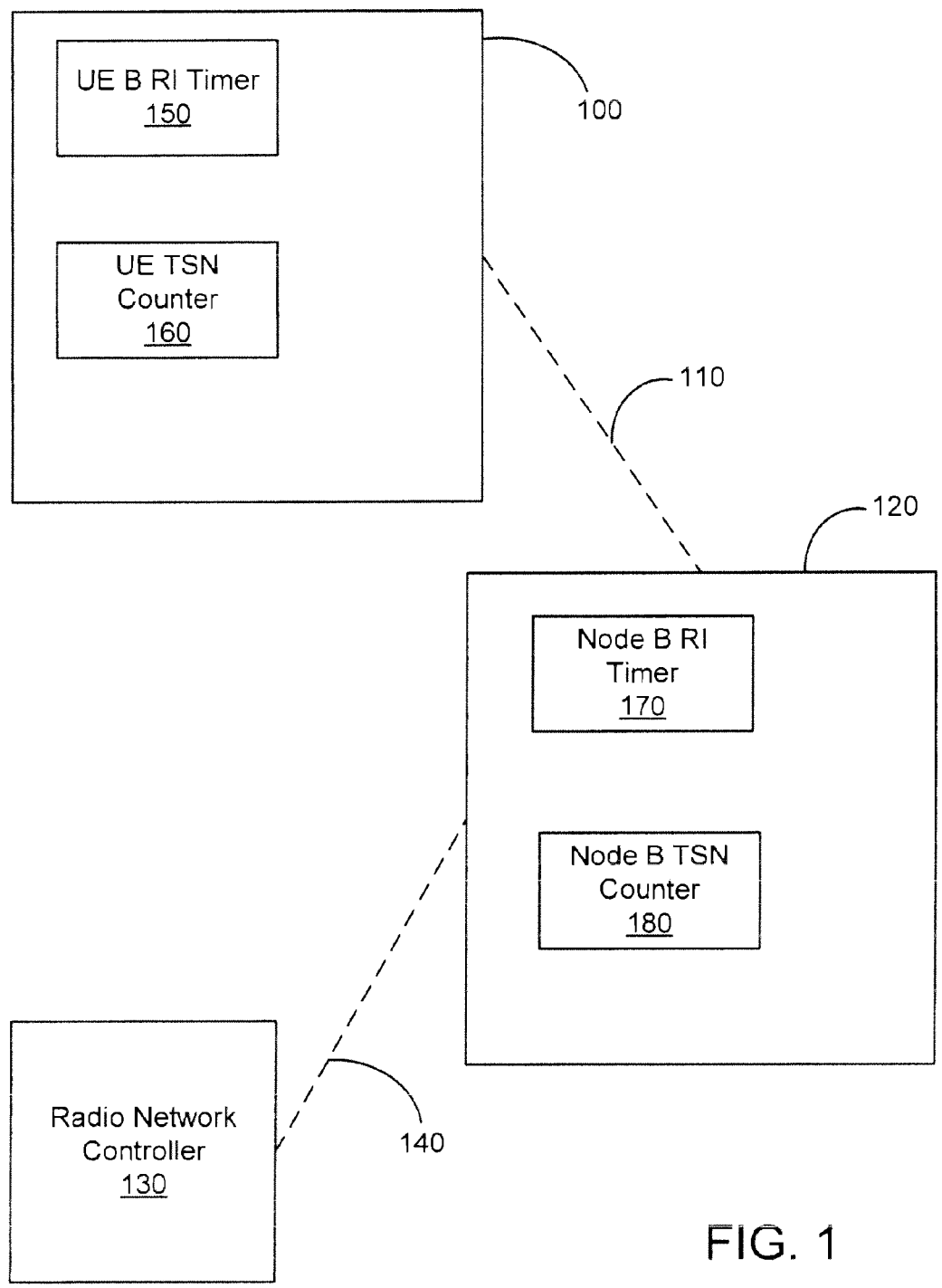
FIG. 1 is a representation showing the interaction among a UE, a base station or Node B, and a radio network controller according to various embodiments of the present invention.

As shown in FIG. 1, a UE 100 receives an HS-DSCH data transmission on a wireless HSDPA downlink 110 from a base station or Node B 120. Node B 120 receives data transmission from a radio network controller 130, such as over a hardwired line 140. As shown in FIG. 1, the UE 100 includes a UE RI timer 150 for use in HSDPA reception in situations where there is no dedicated connection between Node B 120 and the UE 100. Such states include, but are not limited to CELL_FACH and CELL/URA_PCH states. The UE RI timer 150 is used in the MAC-hs reordering function. The UE RI timer 150 is used to count TTIs and is reset every time that the UE 100 receives a data packet. The detection of a data packet that qualifies to trigger the reset of the UE RI timer 150 can be based, for example, upon the detection of the HS-SCCH with the correct H-RNTI. Alternatively, this detection can be based on the correct decoding of the HS-DSCH and cyclic redundancy check (CRC) value in the received data block. In one embodiment, when the UE RI timer 150 is reset, the value is reset to zero. However, in other embodiments the value is reset to some other predefined value.

If the UE 100 does not receive an appropriate data block intended for it in a TTI, then the value of the UE RI timer 150 is incremented by 1. This process continues unless and/or until the value of the UE RI timer 150 reaches a set threshold. If this threshold is met, then the UE RI timer 150, as well as a UE TSN counter 160 in the MAC-hs function of the UE is reset to zero.

Figure 2:
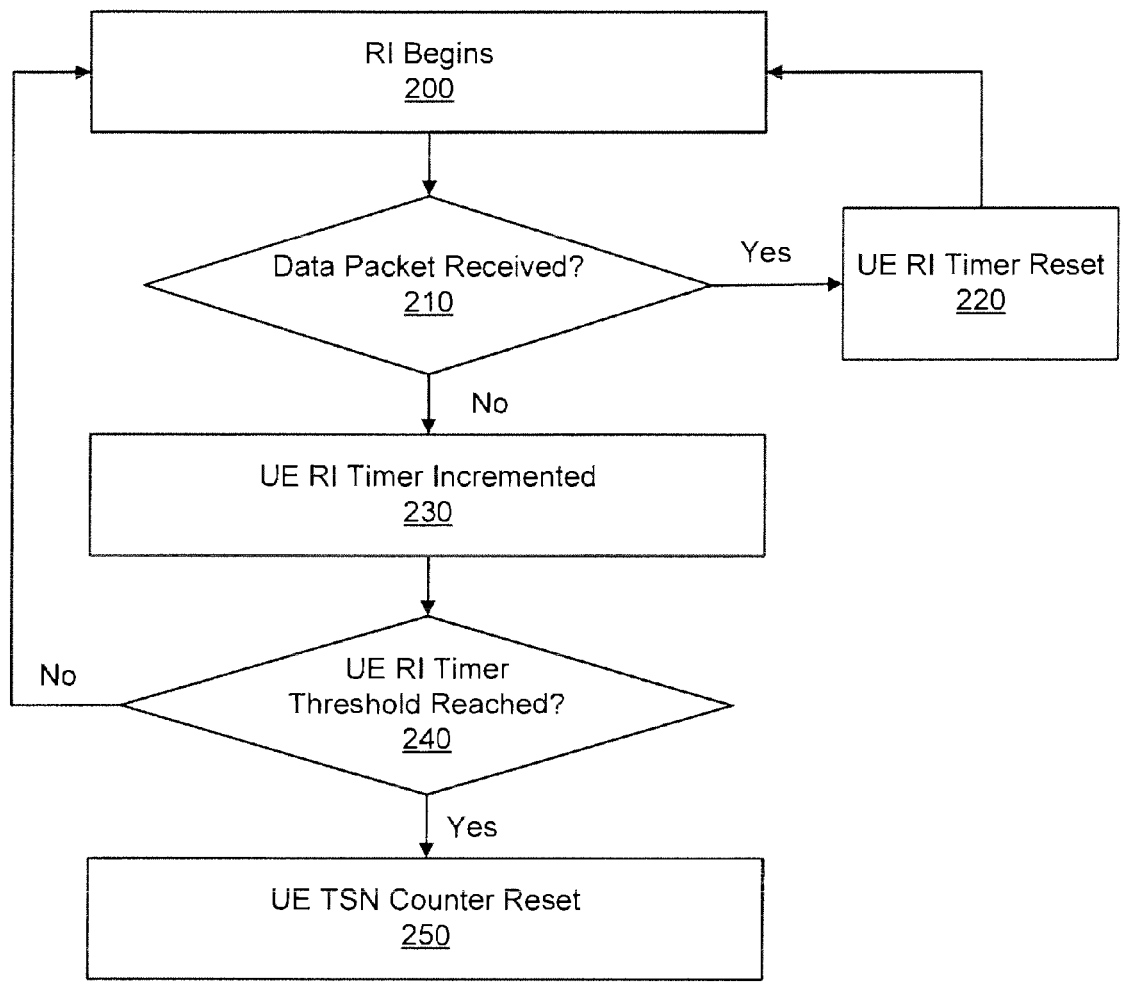
FIG. 2 is a flow chart showing the use of a reception inactivity (RI) timer within a UE according to various embodiments of the present invention.

FIG. 2 is a flow chart showing the operation of the UE 100 in accordance with various embodiments of the present invention. At 200 in FIG. 2, a RTI begins as the UE 100 waits for the receipt of a data packet intended for it from Node B 120. At 210, it is determined whether an appropriate data packet has been received by the UE 100. If a data packet has been received by the UE 100 in a TTI, then at 220 the UE RI timer 150 is reset to zero, and the UE 100 then begins again to wait for the receipt of new data packets. If, on the other hand, no data packet has been received, then the UE 100 increments the UE RI timer 150 by 1 at 230. At 240, it is then determined whether the value of the UE RI timer 150 has reached a specified threshold. If not, then the UE 100 continues to wait for transmissions and counting inactive TTIs. However, if the threshold has been met, then at 250, the UE TSN counter 160 within the UE is reset to zero or some other predefined value, and the UE RI timer 150 is also reset.

In addition to the above, Node B 120 can also include its own Node B RI timer 170. In a manner similar to the UE RI timer 150, the Node B RI timer 170 is reset whenever an appropriate data packet intended for the UE 100 received by Node B 120 from the radio network controller 130 is transmitted to the UE 100. Also like the UE RI timer 150, the Node B RI timer 170 is incremented by 1 whenever appropriate data packets for the UE 100 are not transmitted during a TTI. In the event that the value of the Node B RI timer 170 reaches a predetermined threshold, then Node B 120 can consider the UE 100 to no longer be active. For example, Node B 120 can assume that the UE 100 has moved to a cell operating under a different base station, or that the data transfer session has ended. Therefore, Node B 120 no longer needs to retain the TSN setting for the UE 100. As such, the Node B RI timer 170 (i.e., the counter value in the MAC-hs function) can be reset to zero or some other predetermined value. If, at some later time, new data is sent from the radio network controller 130 to Node B 120 that is intended for the UE 100, then Node B can operate as if the UE 100 is a new UE that has not been previously active under its purview.

Figure 3:
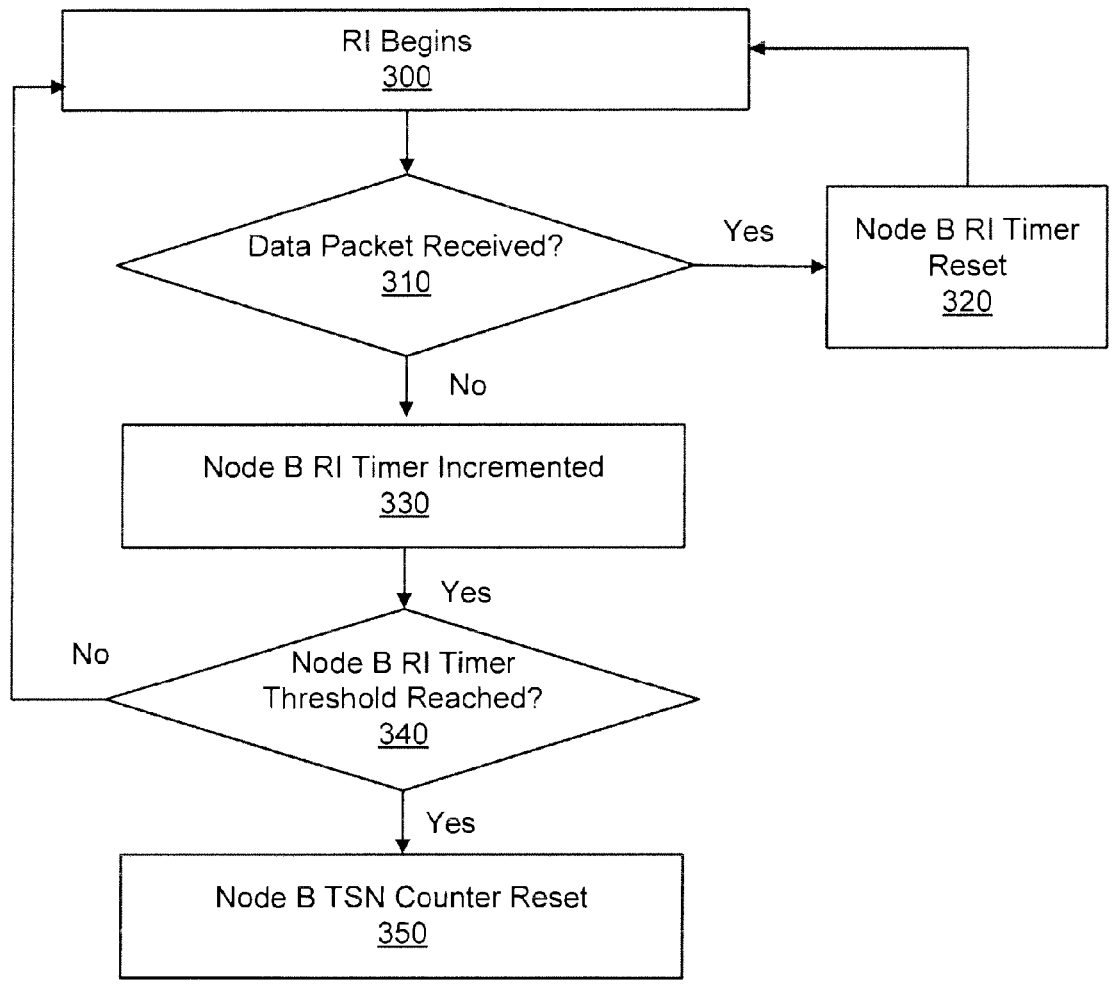
FIG. 3 is a flow chart showing the use of a RI timer within a base station or Node B according to various embodiments of the present invention.

FIG. 3 is a flow chart showing the operation of Node B 120 according to various embodiments of the present invention. At 300 in FIG. 2, a RI begins as the Node B 120 waits for the receipt of a data packet intended for UE from the radio network controller 130. At 310, it is determined whether an appropriate data packet has been received by Node B 120. If a data packet has been received by the Node B 120 in a TTI, then at 320 the Node B RI timer 170 is reset to zero when the data packet is transmitted to the UE 100, and Node B 120 then begins again to wait for an opportunity to transmit new data packets if received from the network. If, on the other hand, no data packet has been transmitted to the UE 100 in a TTI, then the Node B RI timer 170 is incremented by one at 330. At 340, it is then determined whether the value of the Node B RI timer 170 has reached a specified threshold. If not, then Node B 120 continues to wait. However, if the threshold has been met, then at 350 a Node B TSN counter 180 within Node B 120 is reset to zero or some other predefined value, and the Node B RI timer 170 is also reset. At this point, Node B considers the UE as no longer being active in one form or another.

Figure 4:
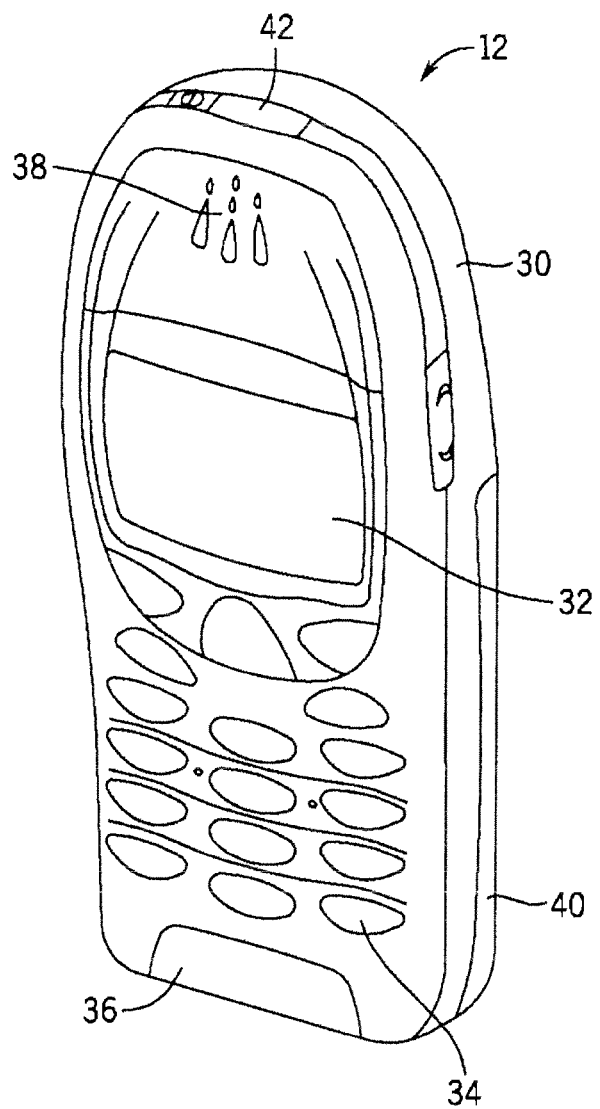
FIG. 4 is a perspective view of an electronic device that can be used in the implementation of the present invention.
Figure 5:
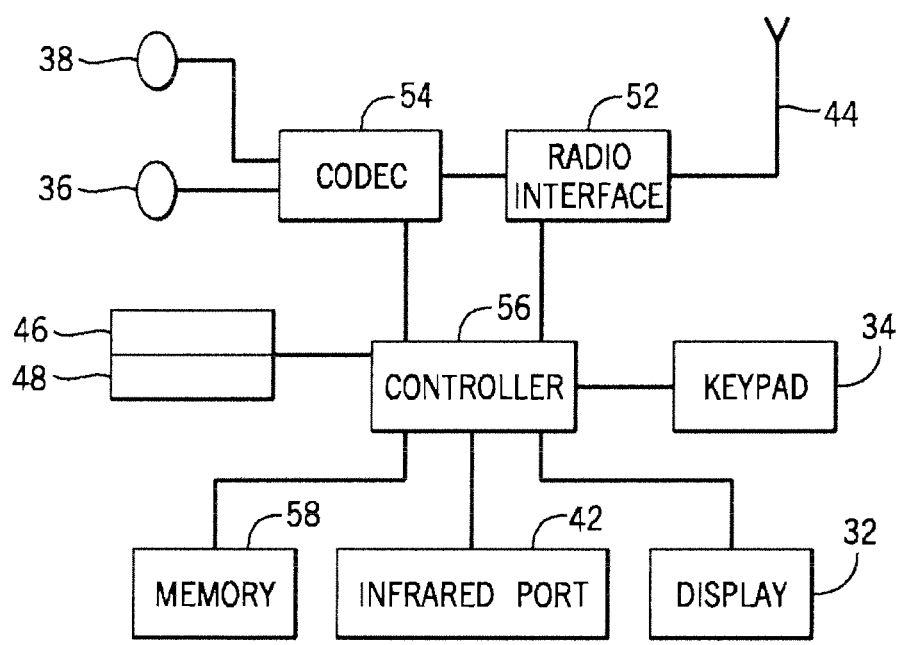
FIG. 5 is a schematic representation of the telephone circuitry of the electronic device of FIG. 4.

FIGS. 4 and 5 show one representative electronic device 12 within which the present invention may be implemented. It should be understood, however, that the present invention is not intended to be limited to one particular type of electronic device 12. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the Nokia range of electronic devices.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A method comprising:
   initiating a reordering buffer timer, where the reordering buffer timer defines a time that a reordering function waits for missing packets from a sequence of packets;
   determining that the missing packets have been lost after a period of inactivity when the reordering buffer timer has expired;
   initiating, by a user equipment not in a dedicated channel connection state, a reception inactivity timer in response to receipt of a last data packet, wherein the reception inactivity timer is a different timer from the reordering buffer timer;
   after a specific time has gone by, adjusting, by the user equipment not in a dedicated channel connection state, the reception inactivity timer if no additional data packet intended for the user equipment has been received by then, such that the reception inactivity timer counts the time from the last received data packet received by the user equipment;
   determining whether a data packet intended for the user equipment has been received before the reception inactivity timer reaches an inactivity threshold time;
   if an intended data packet has been received before the reception inactivity threshold was reached, resetting the reception inactivity timer; and
   if an intended data packet has not been received before the reception inactivity threshold was reached, resetting a transmission sequence number counter which provides a running sequence number for each packet received of the sequence of packets.

2. The method of claim 1, wherein the transmission sequence number counter is reset to a predefined value.

3. The method of claim 1, wherein the transmission sequence number counter is reset to zero.

4. The method of claim 1, wherein, if an intended data packet has not been received before the reception inactivity threshold was reached, the reception inactivity timer is also reset.

5. The method of claim 1, wherein it is determined that an intended data packet intended for the user equipment item has been received by correctly decoding a high speed downlink shared channel and cyclic redundancy check value from a received data block.

6. The method of claim 1, wherein it is determined that an intended data packet intended for the user equipment item has been received by detecting a radio network identifier on a high speed shared control channel.

7. The method of claim 1 further comprising providing the reception inactivity timer at the user equipment item.

8. The method of claim 1, further comprising providing the reception inactivity timer at a network node.

9. A non-transitory computer-readable medium tangibly encoded with a computer program executable by a processor to perform actions comprising:
   initiating a reordering buffer timer, where the reordering buffer timer defines a time that a reordering function waits for missing packets from a sequence of packets;
   determining that the missing packets have been lost after a period of inactivity when the reordering buffer timer has expired;
   initiating, by a user equipment not in a dedicated channel connection state, a reception inactivity timer in response to receipt of a last data packet, wherein the reception inactivity timer is a different timer from the reordering buffer timer;
   after a specific time has gone by, adjusting, by the user equipment not in a dedicated channel connection state, the reception inactivity tinier if no additional data packet intended for the user equipment has been received by then, wherein such that the reception inactivity timer counts the time from the last received data packet received by the user equipment;
   determining whether a data packet intended for the user equipment has been received before the reception inactivity timer reaches an inactivity threshold;
   if an intended data packet has been received before the reception inactivity threshold was reached, resetting the reception inactivity timer; and
   if an intended data packet has not been received before the reception inactivity threshold was reached, resetting a transmission sequence number counter which provides a running sequence number for each packet received of the sequence of packets.

10. The computer program product of claim 9, wherein the transmission sequence number counter is reset to a predefined value.

11. The computer program product of claim 9, wherein the transmission sequence number counter is reset to zero.

12. The computer program product of claim 9, wherein, if an intended data packet has not been received before the reception inactivity threshold was reached, the reception inactivity timer is also reset.

13. The computer program product of claim 9, wherein it is determined that an intended data packet intended for the user equipment item has been received by correctly decoding a high speed downlink shared channel and cyclic redundancy check value from a received data block.

14. The computer program product of claim 9, wherein it is determined that an intended data packet intended for the user equipment item has been received by detecting a radio network identifier on a high speed shared control channel.

15. The computer program product of claim 9, wherein the reception inactivity timer is provided at the user equipment item.

16. The computer program product of claim 9, wherein the reception inactivity timer is provided at a network node.

17. An apparatus, comprising at least one processor; and at least one memory including computer program code, the at least one memory and the computer program code configured to, with the at least one processor, cause the apparatus to perform at least the following:
   to initiate a reordering buffer timer, where the reordering buffer timer defines a time that a reordering function waits for missing packets from a sequence of packets;
   to determine that the missing packets have been lost after a period of inactivity when the reordering buffer timer has expired;
   to initiate, by a user equipment not in a dedicated channel connection state, a reception inactivity timer in response to receipt of a last data packet, wherein the reception inactivity timer is a different timer from the reordering buffer timer;
   after a specific time has gone by, to adjust, by the user equipment not in a dedicated channel connection state, the reception inactivity timer if no additional data packet intended for the user equipment has been received by then, such that the reception inactivity timer counts the time from the last received data packet received by the user equipment;
   to determine whether a data packet intended for the user equipment has been received before the reception inactivity timer reaches an inactivity threshold;
   if an intended data packet has been received before the reception inactivity threshold was reached, to reset the reception inactivity timer; and
   if an intended data packet has not been received before the reception inactivity threshold was reached, to reset a transmission sequence number counter which provides a running sequence number for each packet received of the sequence of packets.

18. The apparatus of claim 17, wherein the transmission sequence number counter is reset to a predefined value.

19. The apparatus of claim 17, wherein the transmission sequence number counter is reset to zero.

20. The apparatus of claim 17, wherein, if an intended data packet has not been received before the reception inactivity threshold was reached, the reception inactivity timer is also reset.

21. The apparatus of claim 17, wherein it is determined that an intended data packet intended for the user equipment item has been received by correctly decoding a high speed downlink shared channel and cyclic redundancy check value from a received data block.

22. The apparatus of claim 17, wherein it is determined that an intended data packet intended for the user equipment item has been received by detecting a radio network identifier on a high speed shared control channel.

23. The apparatus of claim 17, wherein the reception inactivity timer is provided at the user equipment item.

24. The apparatus of claim 17, wherein the reception inactivity timer is provided at a network node.

25. The apparatus of claim 17, wherein the apparatus comprises a chipset.

* * * * *

UNITED STATES PATENT AND TRADEMARK OFFICE
CERTIFICATE OF CORRECTION

PATENT NO. : 9,054,869 B2  
APPLICATION NO. : 12/113885  
DATED : June 9, 2015  
INVENTOR(S) : Juho Pirskanen and Karri Ranta-Aho Page 1 of 1

It is certified that error appears in the above-identified patent and that said Letters Patent is hereby corrected as shown below:

In the claims

In Claim 9:
Column 7, line 36, "tinier" should be deleted and -- timer -- should be inserted.

Signed and Sealed this
Twenty-ninth Day of December, 2015

Michelle K. Lee
*Director of the United States Patent and Trademark Office*